United States Patent [19]

Murphy et al.

[11] Patent Number: 5,329,891
[45] Date of Patent: Jul. 19, 1994

[54] ROCKER ARM ASSEMBLY

[75] Inventors: Richard F. Murphy; John A. DiLauro; Matthew G. Urmaza, all of Torrington, Conn.

[73] Assignee: The Torrington Company, Torrington, Conn.

[21] Appl. No.: 113,462

[22] Filed: Aug. 27, 1993

[51] Int. Cl.⁵ .................................. F01L 1/18
[52] U.S. Cl. ........................... 123/90.39; 123/90.41; 74/519; 74/559; 384/558; 384/581; 384/905.1
[58] Field of Search .................. 123/90.39, 90.41; 74/519, 559; 384/558, 581, 905.1

[56] References Cited

U.S. PATENT DOCUMENTS

| Re. 33,870 | 4/1992 | Fittro et al. | 123/90.41 |
|---|---|---|---|
| 3,251,350 | 5/1966 | Thompson | 123/90.41 |
| 3,466,073 | 9/1969 | Pohle | 123/90.39 |
| 3,621,823 | 11/1971 | Lombardi | 123/90.42 |
| 4,314,732 | 2/1982 | Murphy | 123/90.41 |
| 4,577,911 | 3/1986 | Fredericksen et al. | 308/2 R |
| 4,674,453 | 6/1987 | Dove, Jr. | 123/90.39 |
| 4,697,473 | 10/1987 | Patel | 123/90.39 |
| 4,718,379 | 1/1988 | Clark | 123/90.39 |
| 4,724,802 | 2/1988 | Ishii | 123/90.39 |
| 4,727,832 | 3/1988 | Miyamura et al. | 123/90.39 |
| 4,858,575 | 8/1989 | Fittro et al. | 123/90.41 |
| 4,878,463 | 11/1989 | Fredericksen et al. | 123/90.41 |
| 4,896,635 | 1/1990 | Willermet et al. | 123/90.41 |
| 4,944,257 | 7/1990 | Mills | 123/90.39 |
| 4,967,705 | 11/1990 | Maciag et al. | 123/90.48 |
| 5,044,789 | 9/1991 | Damon et al. | 384/581 |
| 5,063,889 | 11/1991 | Pryba et al. | 123/90.41 |
| 5,074,261 | 12/1991 | Hamburg et al. | 123/90.39 |
| 5,195,475 | 3/1993 | Murphy et al. | 123/90.39 |
| 5,199,800 | 4/1993 | Bauer et al. | 384/905.1 |

Primary Examiner—E. Rollins Cross
Assistant Examiner—Weilun Lo
Attorney, Agent, or Firm—John C. Bigler

[57] ABSTRACT

A bearing support member has two support arms extending in opposite directions along an axis and is adapted for mounting about a stud means. A bearing cup is fixed to the rocker arm, extending over each support arm. Rolling members are provided within an annulus formed between the support member and the bearing cups such that the rocker arm is free to oscillate rotatably with respect to the bearing support member. The bearing cups have a bottom surface forming an interference fit, axially, with an end surface of the bearing support member such that a preload is applied to the bearing support arm to reduce and control axial play. A protrusion and cutouts facilitating the preload and a method of assembly are also disclosed.

22 Claims, 5 Drawing Sheets

ROCKER ARM ASSEMBLY

BACKGROUND OF THE INVENTION

This invention relates generally to valve operating mechanisms for use in internal combustion engines and, more particularly, to an oscillating rocker arm assembly and subassembly having rolling members.

Typically, a rocker arm assembly with rolling members is supported on a support shaft mounted perpendicularly on a support stud extending from the head of the engine. The rocker arm is pivoted on the support shaft, which serves as an inner raceway, by means of drawn cup needle roller bearings mounted on the rocker arm. If desired, a bearing sleeve may be mounted on the support shaft to provide the inner raceway, permitting use of a noncylindrical support arm and facilitating the use of powder metal forming.

In some applications of such rocker arm assemblies, there is a desire to limit axial play between the support shaft and the rocker arm as much as possible. Excess axial play may allow the support structure to contact the rocker arm, preventing the free oscillation provided by the rolling members and causing excess wear. However, because there are manufacturing variations in the components and in the assembly of those components, a zero clearance version of previous rocker arm assemblies has not been practical because of potential cracking of components or other difficulties.

The foregoing illustrates limitations known to exist in present rocker arm bearing assemblies. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing a rocker arm assembly including a rocker arm and a bearing support member, having two support arms extending in opposite directions along an axis, adapted for mounting about a stud means. A bearing cup is fixed to the rocker arm, extending over each support arm. Rolling members are provided within an annulus formed between the bearing support member and the bearing cups such that the rocker arm is free to oscillate rotatably with respect to the bearing support member. The bearing cups have a bottom surface forming an interference fit, axially, with an end surface of the bearing support member.

In other aspects of the present invention, this is accomplished by providing a method of assembling a rocker arm assembly and by providing a bearing assembly for mounting within a rocker arm.

The foregoing and other aspects will become apparent from the following detailed description of the invention when considered in conjunction with the accompanying drawing figures.

BRIEF DESCRIPTION OF THE DRAWING FIGURES

Elements which are identical in the various embodiments of the present invention are indicated by the same reference numeral in the figures.

DETAILED DESCRIPTION

Figure 1:
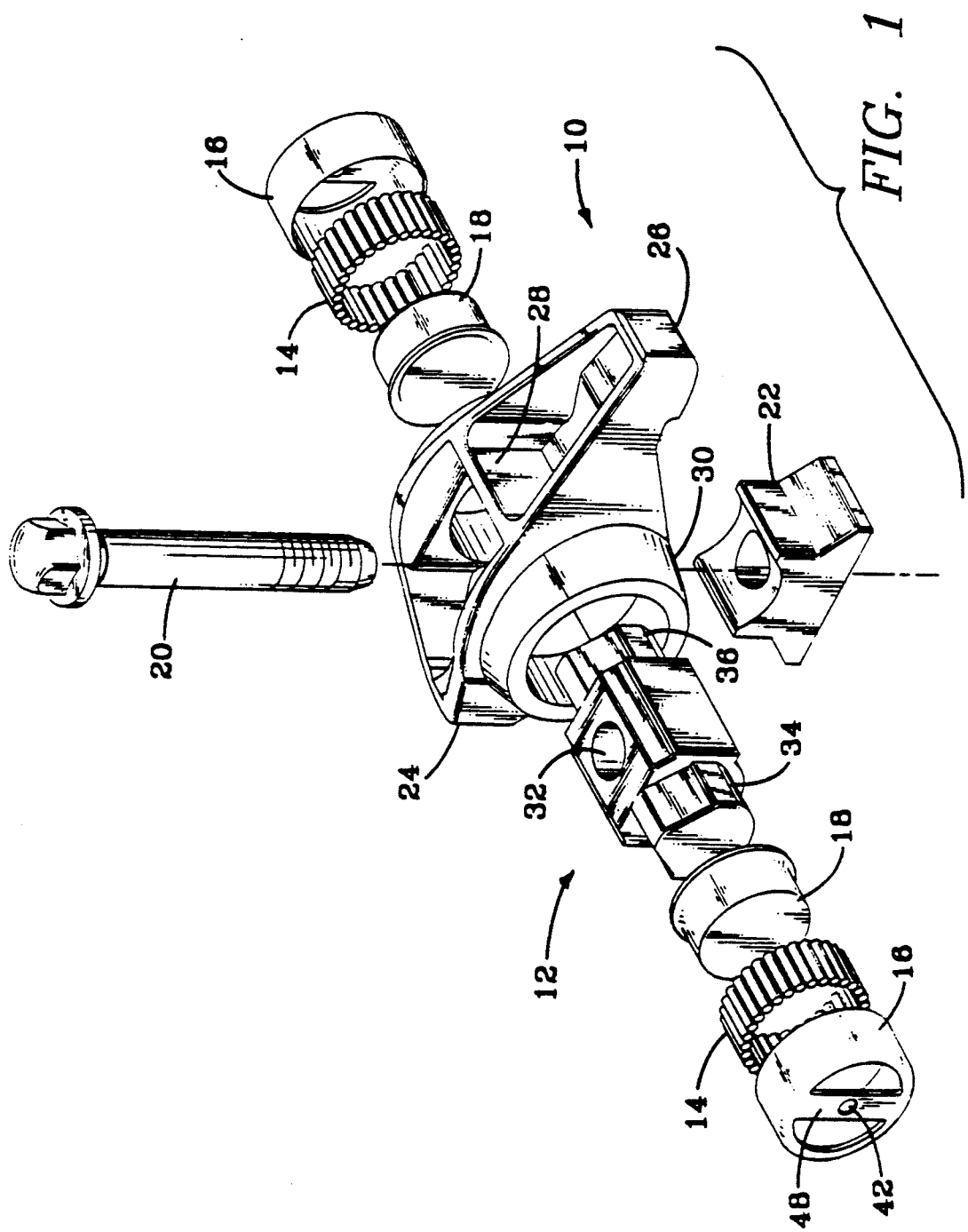
FIG. 1 is an exploded pictorial view illustrating a first embodiment of the rocker arm assembly of the present invention.

Referring now to the drawings, FIG. 1 illustrates an embodiment of the present invention having rocker arm 10 supported on bearing support member 12 by rolling elements 14 within an annulus between bearing cups 16 and bearing support member 12. Bearing support member 12 may include bearing sleeves 18 providing the inner raceway. These elements form an assembly that can be mounted, for example, by a cap screw, bolt or other stud means 20 on pedestal 22, as would be used on a cylinder head of an internal combustion engine.

Rocker arm 10 has first end 24 for engagement with a push rod, not shown, and second end 26 for engagement with a valve stem of a poppet valve, not shown. In the embodiment shown, rocker arm 10 is of a cast configuration including reinforcing web 28 and flanges 30, providing added rigidity. However, the rocker arm assembly of the present invention may be employed with stamped or cast rocker arms of various configurations.

Figure 2:
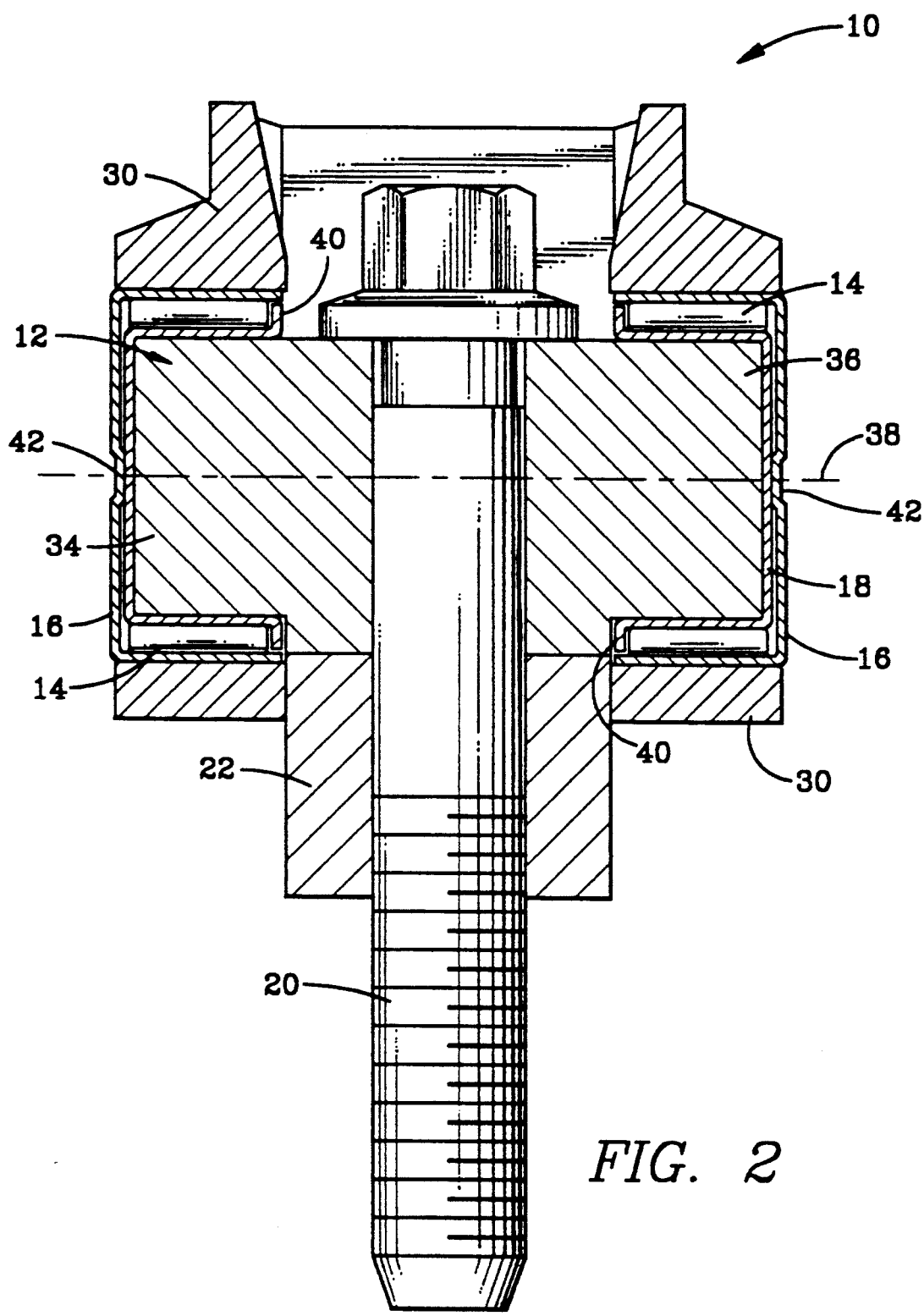
FIG. 2 is an enlarged cross sectional view of the rocker arm assembly of FIG. 1 prior to final positioning of the components.

As illustrated in FIG. 2, bearing support member 12 has a substantially vertical bore 32 for receiving stud means 20 to mount the rocker arm assembly. Bearing support member 12 has support arms 34 and 36 which extend in opposite directions along a common axis 38 perpendicular to stud means 20. Rolling elements 14 may be a full complement of needle rollers, as illustrated, or may employ other types of rolling members 14, with or without retainers.

Bearing cups 16 are rigidly mounted on two spaced apart side portions of rocker arm 10, along axis 38 of bearing support member 12, by any of various fixing means. In the embodiment shown, for example, apertures in the side portions provide an interference fit with bearing cups 36. Bearing cups 16 have a round bottom wall, cylindrical side wall providing an outer bearing race, and open top. Bearing support member 12 has a cross-section smaller than the apertures in the side portions of rocker arm 10, thus allowing bearing support member 12 to be inserted through one of the apertures during assembly.

Figure 3:
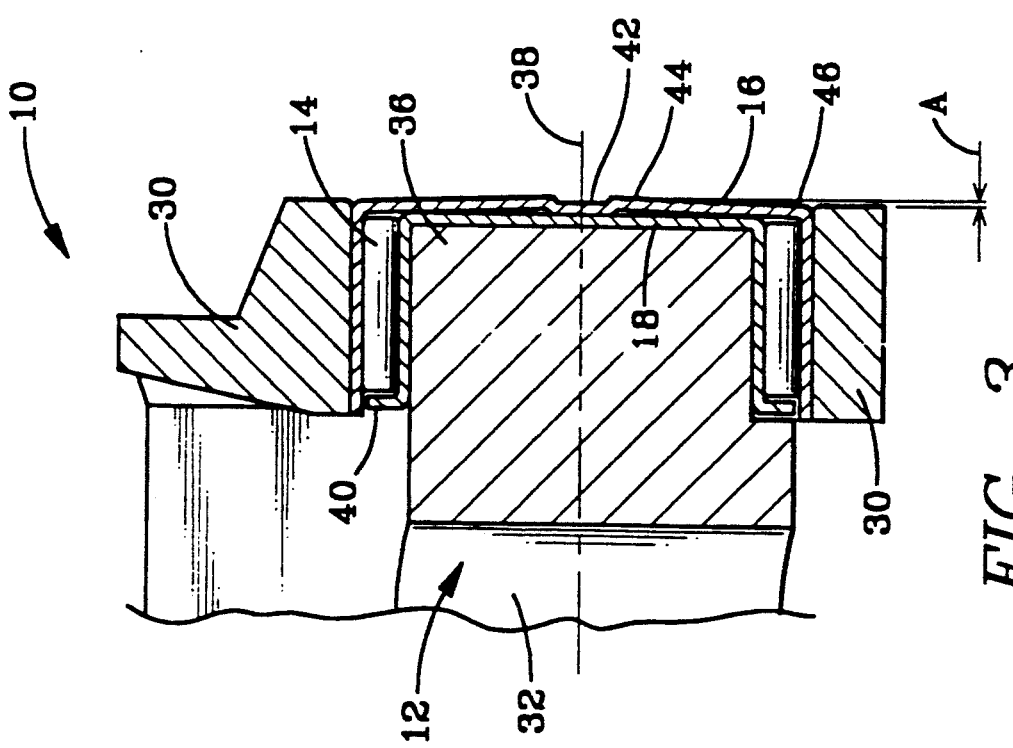
FIG. 3 is a partial cross sectional view of the rocker arm assembly of FIG. 1 after final positioning of the components.

In the embodiment of FIGS. 1 through 3, bearing sleeves 18 are formed with a round end wall, cylindrical side wall, and outwardly extending flange 40 limiting axial movement of rolling members 14 toward stud means 20. The cylindrical side wall provides an inner bearing race for rolling members 14 and facilitates use of powder metal forming of bearing support member 12 by allowing support arms 34 and 36 to have a noncylindrical configuration, as shown. Bearing sleeves 18 are considered optional; that is, many of the advantages of the present invention may be realized in a rocker arm assembly without bearing sleeves 18.

Bearing cups 16 have a protrusion formed, for example, by pressing a dimple 42 in the bottom wall extending inward, toward bearing support member 12. The dimple may be of any convenient shape and is, preferably, near the center of the bottom wall. The purpose of the protrusion is to reduce the contact area between bearing cup 16 and bearing support member 12. Reducing the contact area reduces the friction between the components. If bearing support member 12 includes bearing sleeves 18, the protrusion contacts the end wall of bearing sleeves 18.

In order to limit and control axial play, the bearing assembly of the present invention is preloaded. That is, bearing cups 16 are biased axially inward, against bearing support member 12. Although the biasing may be other means, the preferred embodiments provide the biasing by forming an interference fit between the bottom wall of bearing cups 16 and an end surface of bearing support member 12. FIG. 2 shows the bottom wall of bearing cups 16 substantially flat and parallel to the end wall of bearing sleeves 18 before the final positioning of bearing cups 16 which results in the desired preload.

As illustrated in FIG. 3, the final positioning of bearing cups 16 causes the bottom wall to bend outward, away from stud means 20, applying a biasing force on bearing support member 12 along axis 38. The protrusion facilitates this bending of bearing cups 16 by permitting the bottom wall to form a conical shape around the protrusion without interference with bearing support member 12. The extent of this bending is indicated by the letter "A" in FIG. 3, referring to the distance along axis 38 between the axially outward portion 44 of bearing cups 16 and perimeter portion 46.

In this first embodiment, perimeter portion 46 of bearing cups 16 extends axially outward of flange 30 of rocker arm 10 in FIG. 2, without preload, and is flush with flange 30 in FIG. 3, with preload. This relative configuration is not necessary for the practice of this invention but results in a compact rocker arm assembly and may be convenient during assembly.

To reduce the chance that bearing cups 16 may crack when the rocker assembly is preloaded, due to stress in the preload condition, material is removed from the bottom wall, making the bottom of bearing cups 16 more flexible. In this first embodiment, two "D" shaped openings in the bottom wall form a central bridge 48 including dimple 42, as shown in FIG. 1. Other possible configurations of the bottom wall of bearing cups 16 are described below.

Figure 4:
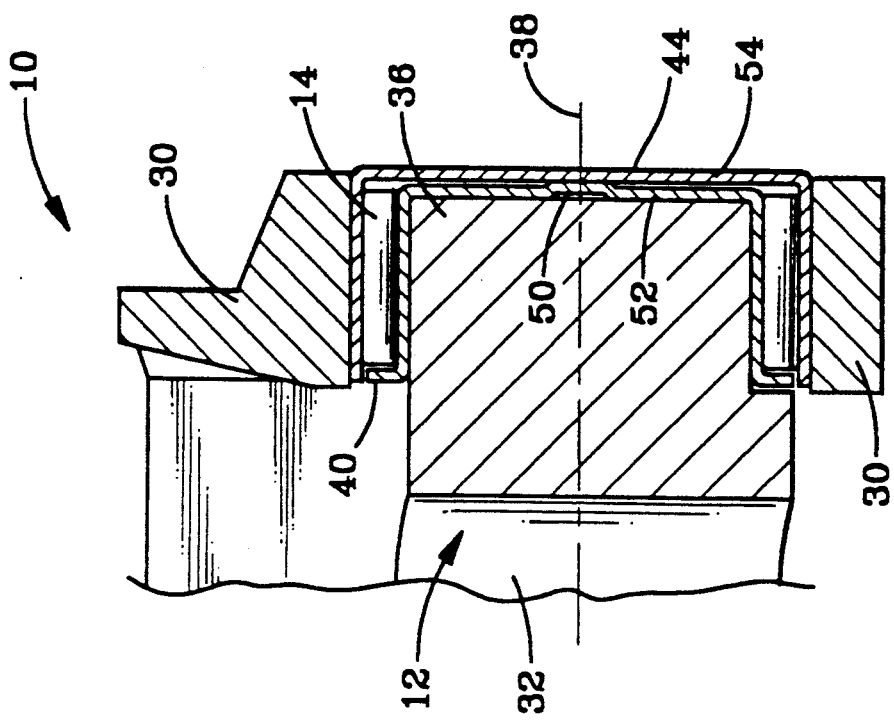
FIG. 4 is a partial cross sectional view illustrating a second embodiment of the rocker arm assembly of the present invention prior to final positioning of the components.

FIG. 4 illustrates a second embodiment of the present invention similar to that of FIGS. 1 through 3 but incorporating dimple 50 forming a protrusion in the end wall of bearing sleeves 52, extending axially outward. The protrusion in the end wall engages a flat bottom wall of bearing cups 54 to achieve the same results as the protrusion in bearing cups 16 of the first embodiment. That is, the protrusion reduces the contact area between bearing support member 12 and bearing cups 54, thereby reducing friction, and also facilitates bending of the bottom wall of bearing cup 54.

Alternatively, if the bearing support member does not include bearing sleeves but, instead, has integral raceways for rolling elements 14, a protrusion may be incorporated in an end surface of the support arms to achieve the same results as the protrusion of bearing sleeves 52 shown in FIG. 4.

Figure 5:
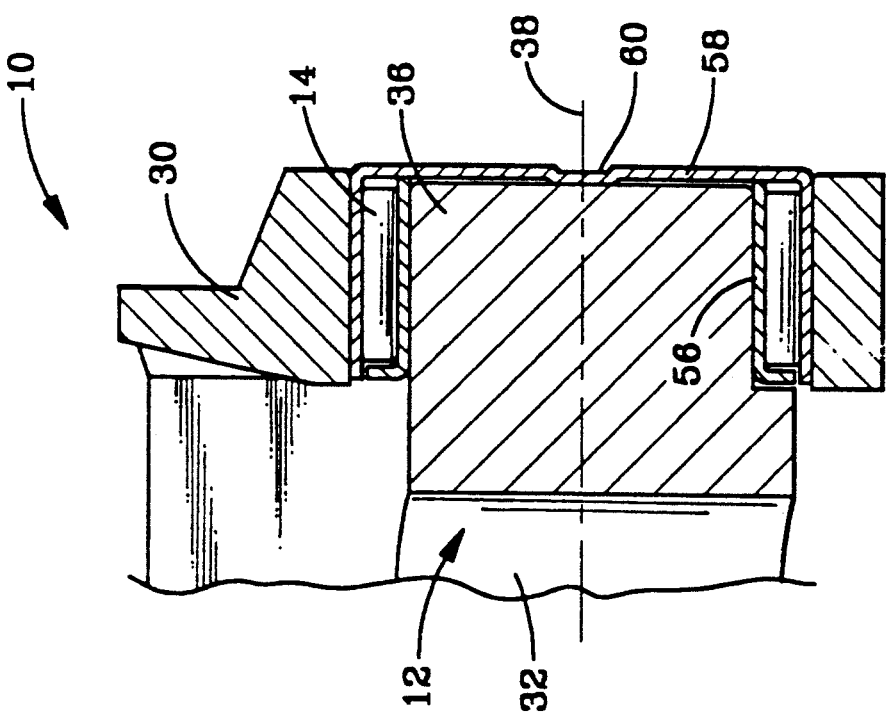
FIG. 5 is a partial cross sectional view illustrating a third embodiment of the rocker arm assembly of the present invention prior to final positioning of the components.

FIG. 5 illustrates a third embodiment of the present invention having open bearing sleeves 56; that is, bearing sleeves 56 have no end wall. Bearing cups 58 are similar to bearing cups 16 of the first embodiment and include dimple 60 which forms a protrusion which engages an end surface of respective support arm 36 to achieve the same results as the protrusion of bearing sleeves 16.

Figure 6:
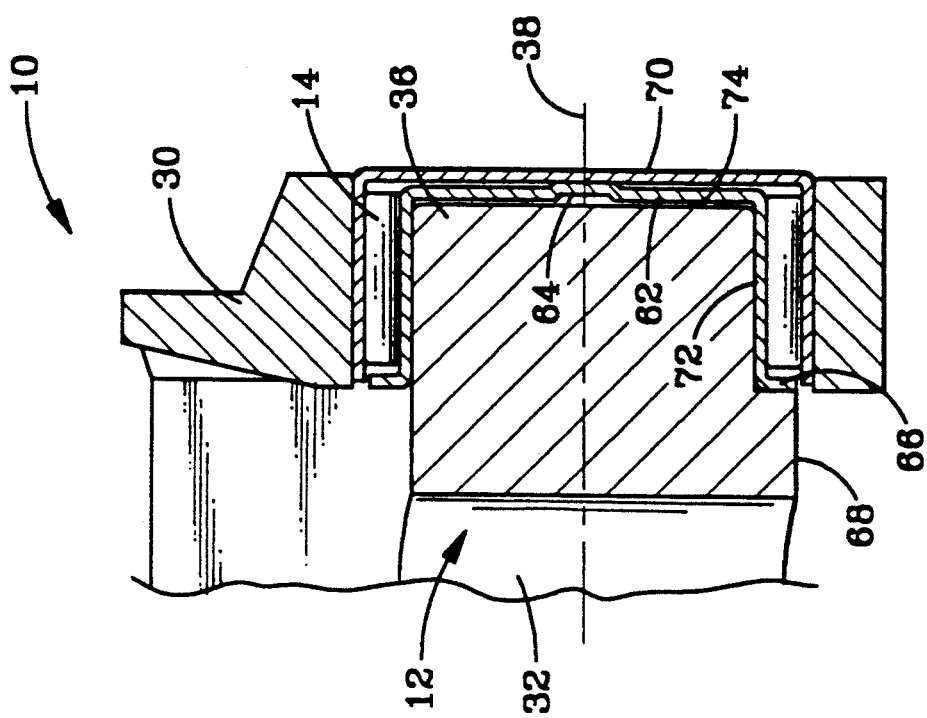
FIGS. 6 is a partial cross sectional view illustrating a fourth embodiment of the rocker arm assembly of the present invention prior to final positioning of the components.

FIG. 6 illustrates a fourth embodiment of the present invention which has bearing sleeves 62 having a closed end with dimple 64. Bearing sleeves 62 include radially outwardly extending flange 66 which abuts center section 68 of bearing support member 12 in the condition without preload, as shown. A protrusion formed by dimple 64 engages a flat bottom wall of bearing cups 70 to cause bending of the bottom wall in the preload condition similar to that shown in FIG. 3.

Bearing sleeves 62 have cylindrical side wall 72 of sufficient length to provide space 74 between the end wall of bearing sleeves 62 and respective support arm 36. Space 74 allows bearing sleeves 62 to bend axially inward in the preload condition, to a conical configuration similar to that of the bottom wall of bearing cups 16 of FIG. 3. Because both the bottom wall of bearing cups 70 and the end wall of bearing sleeves bend to accommodate the axial interference between bearing cups 70 and bearing support member 12, the chance of cracking of components is reduced.

Figure 7:
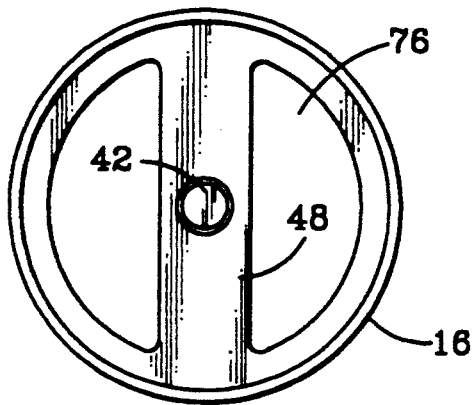
FIGS. 7, 8 and 9 are end views of various bearing cups and bearing sleeves of the embodiments illustrated in FIGS. 1 through 5.
Figure 8:
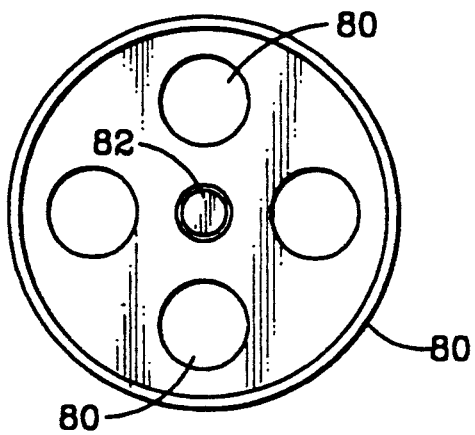
Figure 9:
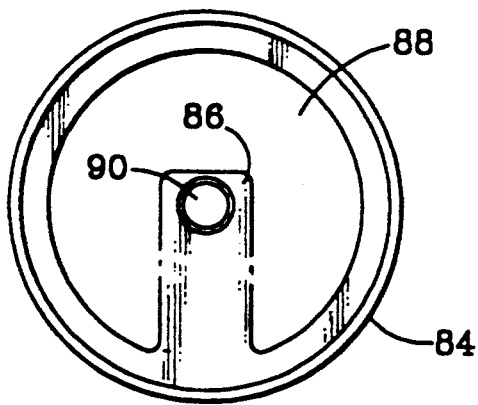
Figure 10:
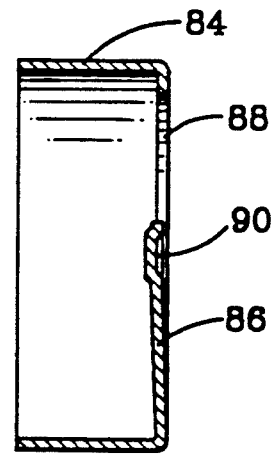
FIG. 10 is a cross sectional view of a bearing cup corresponding to the configuration of FIG. 9.

As stated above, material is removed from the bottom wall of bearing cups 16 of the first embodiment to increase flexibility of the bottom wall and reduce the chance of cracking. FIG. 7 illustrates "D" shaped openings 76 which form central bridge 48 with dimple 42 of bearing cups 16. FIG. 8 illustrates alternative bearing cups 78 with four circular openings 80 distributed about dimple 82 forming a protrusion similar to that of dimple 42. FIG. 9 illustrates alternative bearing cups 84 having tab 86 formed by opening 88 and having dimple 90 forming a protrusion similar to that of dimple 42.

FIGS. 7 through 10 illustrate three of a wide variety of configurations for removing material from the bottom wall of the bearing cups of the present invention such that flexibility is increased. For example, the bottom wall may be formed with an axial displacement such as that of tab 86 shown in FIG. 10. Similarly, bearing sleeve 62 of the embodiment of FIG. 6 may have configurations analogous to those of the bearing cups of FIGS. 7 through 10.

Because there are manufacturing variations in the components and in the rocker arm assembly, a preload may be required on some occasions to assure that axial play in the assembly does not exceed a specified maximum. From the above description, it will be apparent that the present invention provides a rocker arm assembly with a preload condition such that axial play is limited and controlled. Sufficient flexibility is provided such that potential cracking is reduced while providing the axial interference between the bearing cups and the bearing support member resulting in the desired preload condition.

Having thus described the invention, what is claimed is:

1. A rocker arm assembly for mounting about a stud means, the rocker arm assembly comprising:
    a rocker arm;
    a bearing support member having two support arms extending in opposite directions along an axis, the bearing support member being adapted for mounting about the stud means;
    two bearing cups fixed to the rocker arm, one bearing cup extending over each support arm, the bearing cups having a bottom surface forming an interference fit such that a preload results along said axis from deformation of at least one of said bearing cups; and
    rolling members within an annulus formed between the bearing support member and the bearing cups such that the rocker arm is free to oscillate rotatably with respect to the bearing support member.

2. The rocker arm assembly according to claim 1, further comprising two bearing sleeves, one bearing sleeve mounted over each support arm between the rolling members and the respective bearing support arm.

3. The rocker arm assembly according to claim 2, wherein the bearing sleeves provide an end surface forming the interference fit with the bottom surface of the respective bearing cup.

4. The rocker arm assembly according to claim 3, wherein each bearing sleeve includes an end portion having a protrusion contacting the respective bearing cup such that a contact area between the bearing cup and the bearing support member is reduced.

5. The rocker arm assembly according to claim 3, wherein each bearing sleeve includes an end portion having at least one aperture such that flexibility of the bearing sleeve is enhanced.

6. The rocker arm assembly according to claim 5, wherein said at least one aperture forms a tab extending to the axis of the bearing support member.

7. The rocker arm assembly according to claim 5, wherein said at least one aperture comprises a plurality of circular openings disposed about an area contacting the bottom surface of the respective bearing cup.

8. The rocker arm assembly according to claim 5, wherein said at least one aperture comprises two D-shaped openings forming a bridge contacting the bottom surface of the respective bearing cup.

9. The rocker arm assembly according to claim 1, wherein the bottom surface of the bearing cups includes a dimple forming a protrusion contacting the end surface of the bearing support member.

10. The rocker arm assembly according to claim 1, wherein the bottom surface of the bearing cups includes at least one aperture such that flexibility of the bottom surface of the bearing cups is enhanced.

11. The rocker arm assembly according to claim 10, wherein said at least one aperture forms a tab extending to the axis of the bearing support member.

12. The rocker arm assembly according to claim 10, wherein said at least one aperture comprises a plurality of circular openings disposed about an area contacting the bearing support member.

13. The rocker arm assembly according to claim 10, wherein said at least one aperture comprises two D-shaped openings forming a bridge contacting the bearing support member.

14. The rocker arm assembly according to claim 1, wherein the bottom surface of the bearing cups includes a dimple forming a protrusion contacting the bearing support member.

15. The rocker arm assembly according to claim 1, wherein the bearing support member includes an end surface with a protrusion contacting the respective bearing cup such that contact area between the bearing cup and the bearing support member is reduced.

16. The rocker arm assembly according to claim 1, wherein the bearing cup is mounted with an aperture of the rocker arm such that a perimeter portion of the bearing cup is flush with an adjacent surface of the rocker arm.

17. A bearing assembly for mounting within a rocker arm, the bearing assembly comprising:
    a bearing support member having two support arms extending in opposite directions along an axis, the bearing support member being adapted for mounting about the stud means;
    two bearing cups adapted for fixing to the rocker arm, one bearing cup extending over each support arm, the bearing cups having a bottom surface forming an interference fit such that preload along said axis results from deformation of the bearing cups; and
    rolling members within an annulus formed between the bearing support member and the bearing cups such that the rocker arm is free to oscillate rotatably with respect to the bearing support member.

18. A method of assembling a rocker arm assembly comprising the steps of:
    providing a bearing support member having two support arms extending in opposite directions along an axis, the bearing support member being adapted for mounting about a stud means;
    positioning the bearing support member within an aperture of a rocker arm with a bearing cup over each support arm of the bearing support member and rolling members within an annulus between the bearing cup and the respective support arm; and
    pressing at least one bearing cup axially inward, with respect to the axis of the bearing support member, until a bottom surface of the bearing cup is resiliently deflected and a preload is applied to the bearing support member by the bearing cup.

19. The method of assembling a rocker arm assembly according to claim 18, wherein said at least one bearing cup is pressed axially inward until a perimeter portion of the bearing cup is flush with an adjacent surface of the rocker arm.

20. The method of assembling a rocker arm assembly according to claim 18, further comprising two bearing sleeves, one bearing sleeve mounted over each support arm such that the rolling members are between the bearing sleeve and the respective bearing cup.

21. A method of assembling a rocker arm assembly comprising the steps of:
    providing a bearing support member having two support arms extending in opposite directions along an axis, the bearing support member being adapted for mounting about a stud means and including a bearing sleeve mounted over each support arm;
    positioning the bearing support member within an aperture of a rocker arm with a bearing cup over each support arm of the bearing support member and rolling members within an annulus between the bearing cup and the respective bearing sleeve; and pressing at least one bearing cup axially inward, with respect to the axis of the bearing support member, until the bearing sleeve engages a bottom surface of the bearing cup such that the bearing sleeve is distorted and a preload is applied to the bearing support member by the bearing sleeve.

22. The method of assembling a rocker arm assembly according to claim 21, wherein the bottom surface of the bearing cup is also resiliently deflected during the pressing of the bearing cup axially inward.

* * * * *